United States Patent
Wu et al.

(10) Patent No.: US 9,813,163 B2
(45) Date of Patent: Nov. 7, 2017

(54) INTEGRATED COHERENT RECEIVER HAVING A GEOMETRIC ARRANGEMENT FOR IMPROVED DEVICE EFFICIENCY

(71) Applicant: ArtIC Photonics Inc., Ottawa (CA)

(72) Inventors: Fang Wu, Ottawa (CA); Yongbo Tang, Ottawa (CA); Yury Logvin, Ottawa (CA); Christopher D. Watson, Ottawa (CA); Kirill Y. Pimenov, Ottawa (CA)

(73) Assignee: Artic Photonics Inc., Ontario (CA)

( * ) Notice: Subject to any disclaimer, the term of this patent is extended or adjusted under 35 U.S.C. 154(b) by 48 days.

(21) Appl. No.: 15/078,330

(22) Filed: Mar. 23, 2016

(65) Prior Publication Data

US 2016/0285561 A1    Sep. 29, 2016

Related U.S. Application Data

(60) Provisional application No. 62/136,830, filed on Mar. 23, 2015, provisional application No. 62/136,976, filed on Mar. 23, 2015.

(51) Int. Cl.
| | |
|---|---|
| *H04B 10/61* | (2013.01) |
| *G02B 6/30* | (2006.01) |
| *G02B 6/42* | (2006.01) |
| *H04B 10/25* | (2013.01) |
| *G02B 6/28* | (2006.01) |

(52) U.S. Cl.
CPC ............ *H04B 10/61* (2013.01); *G02B 6/305* (2013.01); *G02B 6/4206* (2013.01); *G02B 6/428* (2013.01);
(Continued)

(58) Field of Classification Search
CPC .................................................. H04B 10/615
See application file for complete search history.

(56) References Cited

U.S. PATENT DOCUMENTS

| 9,246,596 B2 * | 1/2016 | Barton ................. H04B 10/505 |
| 2009/0185810 A1 * | 7/2009 | Kaplan ................... G02F 1/225 398/184 |

(Continued)

FOREIGN PATENT DOCUMENTS

WO        2015015020 A1    2/2015

OTHER PUBLICATIONS

Belling, A., et al., "Fully-Inegrated Polarization-Diversity Coherent Receiver Module for 100G DP-QPSK", OML5, OFC', 2011; 3 pages.
Houtsma, V., et al., "Manufacturable Monolithically Integrated InP Dual-Port Coherent Receiver for 100G PDM-QPSK Applications", OML2, OFC', 2011; 3 pages.
(Continued)

*Primary Examiner* — Shi K Li
(74) *Attorney, Agent, or Firm* — Seyfarth Shaw LLP (57) ABSTRACT

Disclosed herein is a monolithically integrated coherent receiver chip which has a geometric arrangement of the on-chip components that significantly improves the performance and the manufacturability of a coherent receiver module for Dual Polarization Quadrature Phase Shift Keyed (DP-QPSK) applications and other optical coherent detection systems. The coherent receiver chip comprises two optical hybrids, three optical inputs and eight electrical outputs with the two optical hybrids oriented perpendicular to the optical inputs and the electrical outputs which are widely spaced and arranged in a co-linear fashion that simplifies module design and assembly. The proposed geometric arrangement also replaces any optical waveguide crossings with vertical electrical-optical crossings and includes electrical transmissions which are used to minimize channel skew. The proposed configuration also has the additional benefit of improved thermal management by separating the module's trans-impedance amplifiers.

16 Claims, 10 Drawing Sheets

(52) U.S. Cl.
CPC .......... *G02B 6/4295* (2013.01); *H04B 10/25* (2013.01); *G02B 6/2813* (2013.01); *G02B 6/4213* (2013.01); *G02B 6/4286* (2013.01)

(56) References Cited

U.S. PATENT DOCUMENTS

2010/0054761 A1    3/2010   Chen et al.
2012/0106984 A1*  5/2012   Jones .................. H04L 27/223
                                                                 398/214

OTHER PUBLICATIONS

PCT Written Opinion of the International Searching Authority with PCT International Search Report, dated May 9, 2016; 9 pages.
Farwell, S., et al., "InP Coherent Receiver Chip with High Performance and Manufacturability for CFP2 Modules", OFC 2014; 3 pages.
Hu, T., et al., "High-yield Manufacturing of InP Dual-Port Coherent Receiver Photonic Integrated Circuits for 100G PDM-QPSK Application", IPRM 2011; 4 pages.
Kunkel, R. et al., "Design Improvements for INP-Based 90°-Hybrid OEICx for 100GE Coherent Frontends", IPRM 2010; 4 pages.
Runge, P., et al., "Monolithic InP Receiver Chip with a 90° Hybrid and 56GHZ Balanced Photodiodes", ECOC Technical Digest 2012; 3 pages.
Tsunashima, S., et al., "Silica-based, compact and variable-optical-attenuator integrated coherent receiver with stable optoelectronic coupling system", Optics Express, Nov. 19, 2012, vol. 20, No. 24; 6 pages.

* cited by examiner

INTEGRATED COHERENT RECEIVER HAVING A GEOMETRIC ARRANGEMENT FOR IMPROVED DEVICE EFFICIENCY

CROSS REFERENCE TO RELATED APPLICATIONS

This application claims priority to U.S. provisional application Nos. 62/136,830, entitled "INTEGRATED COHERENT RECEIVER CHIP HAVING A GEOMETRIC ARRANGEMENT FOR IMPROVED DEVICE EFFICIENCY," filed Mar. 23, 2015, and 62/136,976, entitled "INTEGRATED COHERENT RECEIVER CHIP HAVING A GEOMETRIC ARRANGEMENT FOR IMPROVED DEVICE EFFICIENCY," filed Mar. 23, 2015, which are both herein incorporated by reference.

FIELD OF THE INVENTION

The invention is related to an integrated coherent receiver chip to be used in coherent receiver module for the applications using Dual Polarization Quadrature Phase Shift Keyed (DP-QPSK) modulation format, or other higher degree modulation formats.

BACKGROUND OF THE INVENTION AND PRIOR ART

Figure 1:
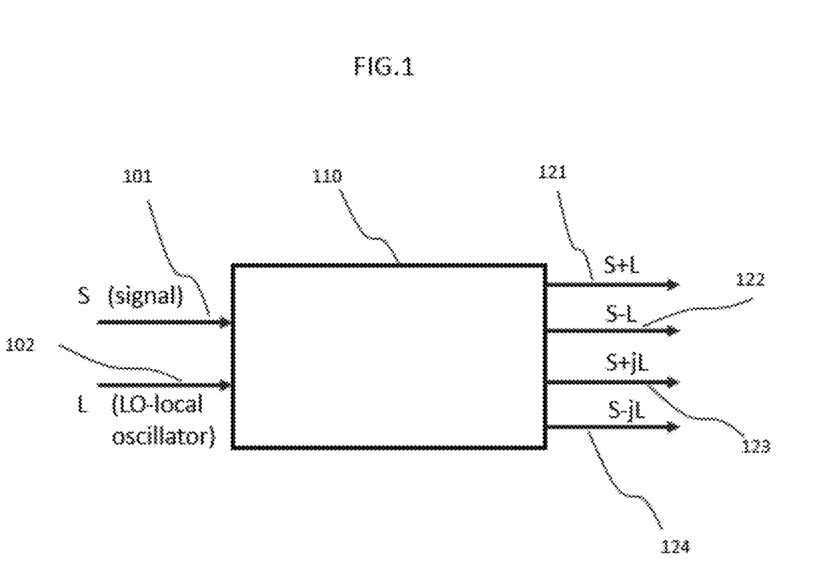
FIG. 1 presents a schematic view of the generic 90° hybrid with two inputs and four outputs.

A coherent receiver module is used in a transmission system adopting dual polarization and quadrature phase-shifted keying modulation format (DP-QPSK). By transmitting 2 bits per symbol on orthogonal polarizations this modulation format quadruples the capacity of a simple on-off keying systems and also extends transmission reach at the same time. The function of the coherent receiver is to demodulate the transmitted waveforms by separating the signal (Sig) into two orthogonal polarizations (SigX and SigY) and resolving the phase of each polarization into in-phase (I) and quadrature-phase (Q) components by coherently mixing the separated signals with a Local Oscillator (LO). A critical aspect of this receiving process is that the SigX and SigY should have a fixed phase relation to the LO; and it is also important to balance both the time delays and the field amplitudes at photodetectors where the fields are mixed. A further complication of this demodulation process is that balanced detection must also be used to suppress common mode noise that would otherwise corrupt the signal quality of the I and Q components. Moreover, all these requirements must be satisfied over a wide operating wavelength range, high symbol rate, and over an extended temperature range Illustrated in FIG. 1 is the general configuration of the 90° optical hybrid that is needed to resolve a signal into I and Q components. Here the phase relationship between the signal amplitude S (either SigX or SigY) and co-polarised LO amplitude L is shown: the S−L and S+L indicate that the two outputs from the hybrid have a phase difference of 180° between each other, and form the I channel while the S−jL and S+jL indicate that the two outputs have a phase relationship displaced by 90° with respect to S−L and S+L, and form the Q channel. While the time/phase difference, or skew, between the I and Q channels of both SigX and SigY is of concern, the most exacting requirement is reserved for the difference in time delay between the balanced detectors from which the I and Q components are derived. This latter requirement places stringent demands upon the technologies from which the coherent receiver is constructed.

Figure 2A:
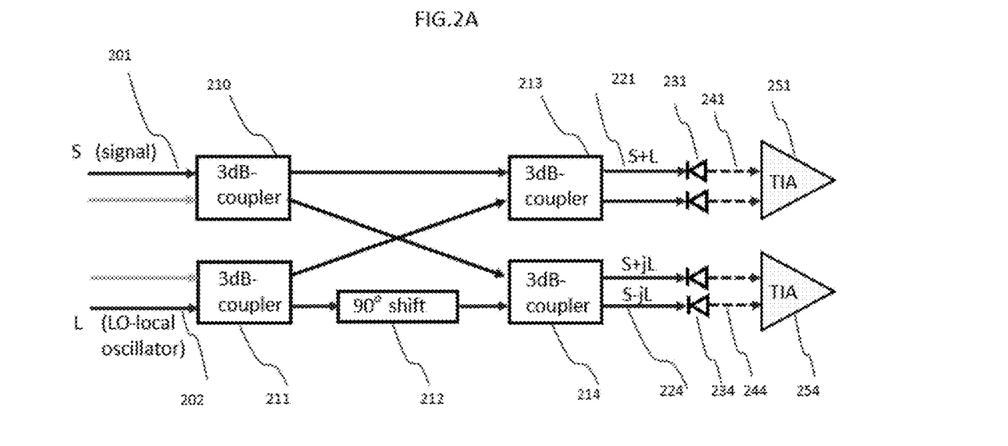
FIG. 2A gives a schematic view of a 90° hybrid which is implemented by means of a waveguide mode interference coupler.
Figure 2B:
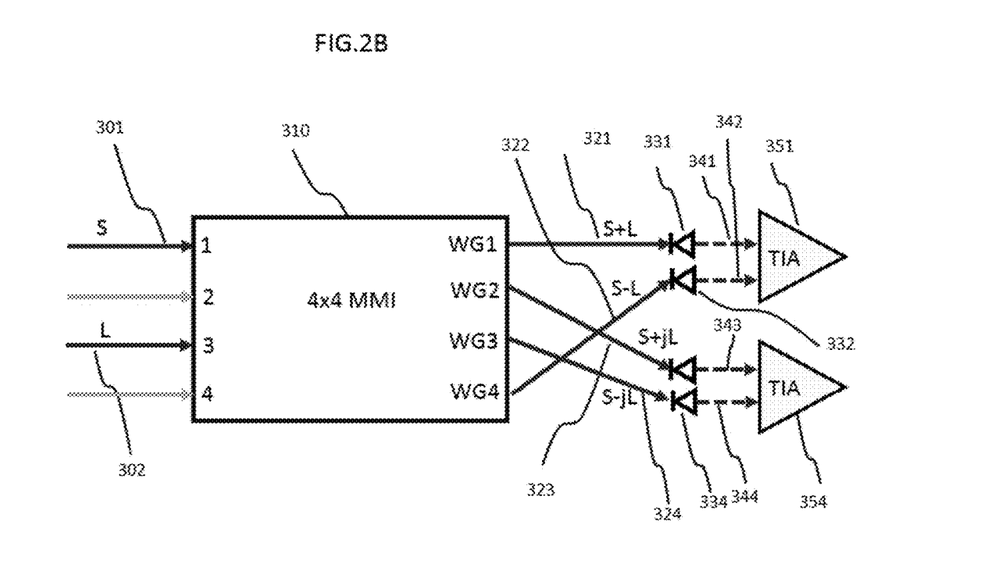
FIG. 2B shows a schematic view of the 90° hybrid in the form of 4×4 MMI coupler with optical waveguide crossings that are needed to form balanced detector pairs for the I and Q channels.
Figure 2C:
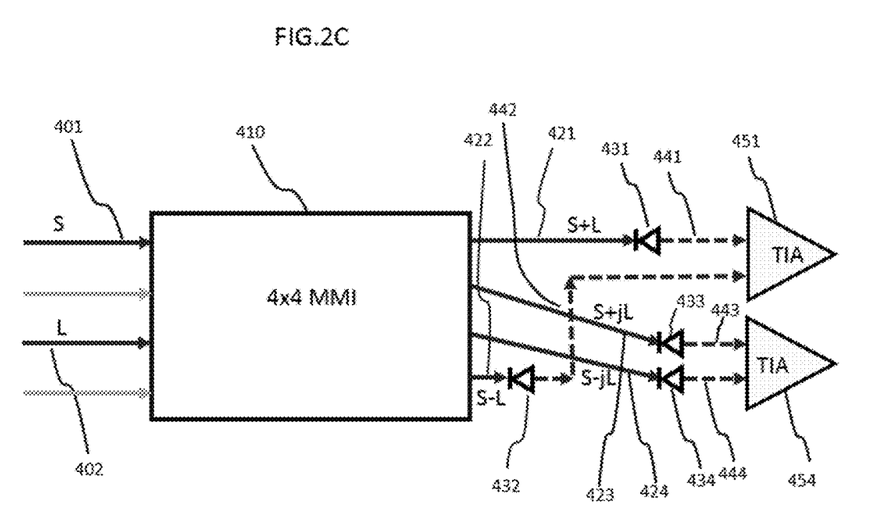
FIG. 2C gives a schematic view of the 90° hybrid in the form of 4×4 MMI coupler with the electrical crossings over the optical waveguides (electrical-optical crossings) to form balanced detector pairs for the I and Q channels.

The 90° hybrid can be realized with either a waveguide mode interference coupler (FIG. 2A) or a 4×4 Multimode Interference (MMI) coupler (FIG. 2B). While the former is usually used in a material system with lower refractive index contrast, such as Silica, the latter is more appropriate for a material system with high refractive index contrast, such as Indium Phosphide (InP) or Silicon-On-Insulator (SOI). In the case of a 4×4 MMI coupler, the SigX or SigY and LO are launched into the optical 90° hybrid asymmetrically (using either ports 1, 3 or ports 2, 4) to construct a 180° phase difference between the four output waveguides with the middle two outputs (WG2 and WG3) as a pair and the two outermost outputs (WG1 and WG4) as another pair which need to be brought together to the differential input of the Trans-Impedance Amplifier (TIA) by either two waveguide crossings (FIG. 2B) or electrical crossings (FIG. 2C).

Figure 3:
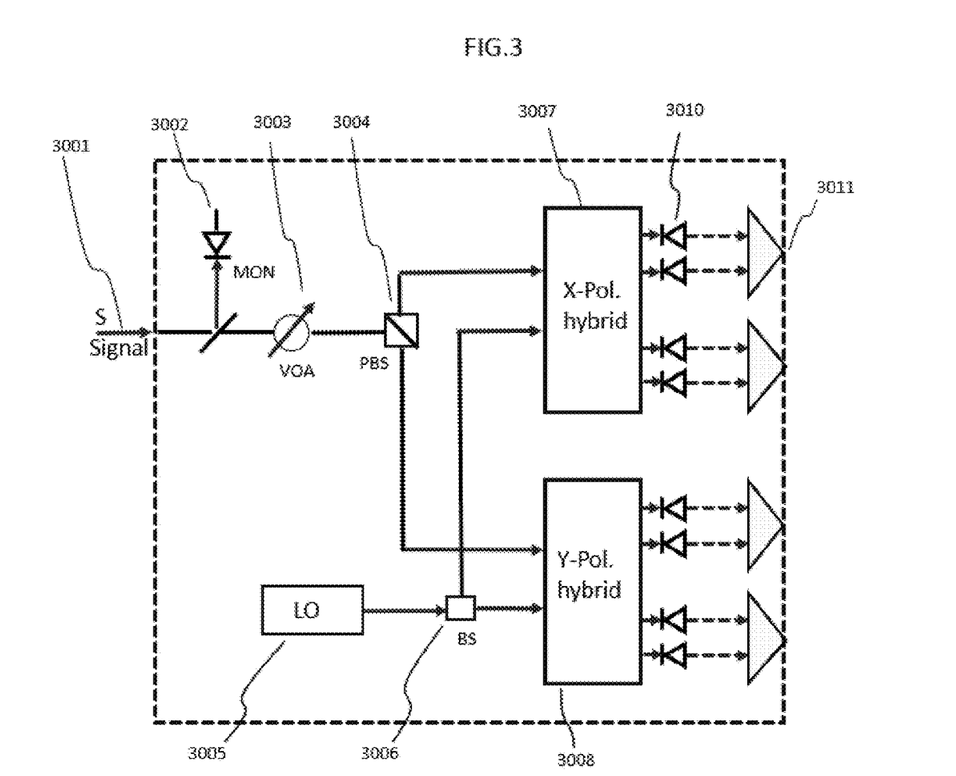
FIG. 3 gives a schematic of a fully integrated DP-QPSK receiver chip.

A fully integrated DP-QPSK receiver chip should contain all elements shown in FIG. 3, including
 (1) two pairs of four high speed (32Gbaud) photodetectors
 (2) two 90° optical hybrids
 (3) one optical signal input and two pairs of four electrical outputs
 (4) one 1:2 Beam Splitter (BS)
 (5) one narrow linewidth tunable laser (LO)
 (6) one Polarization Beam Splitter (PBS)
 (7) one Variable Optical Attenuation (VOA), and
 (8) one Monitor (MON)

As is seen in FIG. 3, the components in (1)-(3) are configured into two nominally identical sub-circuits which are used to mix the signal polarizations SigX, SigY which are separated by (6), with a local oscillator (5), which is first split by (4). Also included are a variable optical attenuator (7) and monitor (8) which are used to condition the signal prior to demodulation.

Due to the complexity of the functionalities and the stringent performance requirements on the device, the fully integrated solution has always been the first choice [U.S. Pat. No. 0,054,761 A1, 2010, Y. K Chen, et al.], however extensive development has also been seen on hybrid solutions, i.e. a combination of integrated solutions for a subset of the items in the above list, and the rest being discrete components. The former wins on the reliability and compactness at the cost of yield and manufacturability because of the integration of several extremely difficult components; while the latter wins on the opportunity to combine known good components with best available performance at the cost of yield and manufacturability because of a more complicated and high precision assembly processes.

Figure 4:
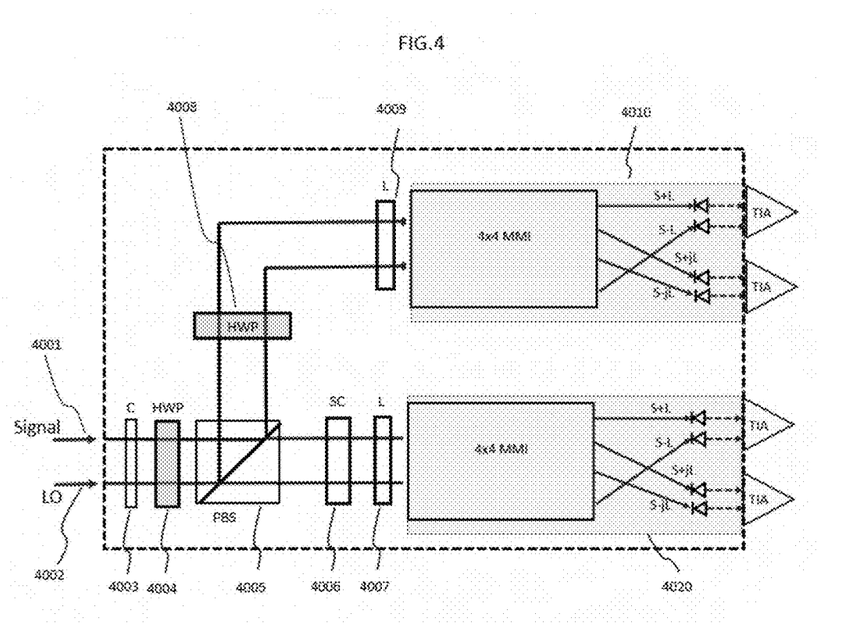
FIG. 4 illustrates a prior art DP-QPSK receiver using two ICR chips and a variety of bulk optics components.

In the prior art, there are different hybrid combination solutions, depending on the chosen technology and technical approaches. The three most common implementations are:
 1) One integrated chip incorporating elements (2)-(4) and (6)-(7), where (2) uses two waveguide mode interference couplers, is assembled with a high speed photodetector array and an external LO [S, Tsunashima, F. Nakajima, Y. Nasu, R. Kasahara, Y. Nakanishi, T. Saida, T. Yamada, K. Sano, T. Hashimoto, H. Fukuyama, H. Nosaka, and K, Murata, 'Silica-based, compact and variable-optical-attenuator integrated coherent receiver with stable optoelectronic coupling system', Optics Express, Vol. 20, p 27174, 2012]. The weakness of this approach is that it places the stringent requirements on the optical assembly processes in order to meet the performance requirements on the in-channel skew and field amplitudes balance.
 2) Two coherent receiver chips, which contain the items (1)-(3), where (2) uses two 4×4 MMI couplers with output waveguide crossings [A. Belling, N. Ebel, A. Matiss, and G. Unterborsch. 'Fully-Integrated Polarization-Diversity Coherent Receiver Module for 100 G DP-QPSK", OML5, OFC '2011], as shown in FIG. 4. This approach has the 90° hybrids and photodetectors monolithically integrated on the same chip; and while this arrangement addresses the danger of performance impairments caused by skew between the I and Q channels and between detector pairs, the chip suffers from both a large footprint and high optical loss. These disadvantages are the results of long propagation path required to realize low loss and low crosstalk optical waveguide crossings that are necessary for this layout. A further disadvantage of this arrangement is that two die attachments with simultaneous optical and polarization alignments are needed on the four optical input ports—a difficult and unreliable assembly process. Also, because SigX and SigY are derived from separated optical assemblies skew between polarization components is also of concern.

Figure 5:
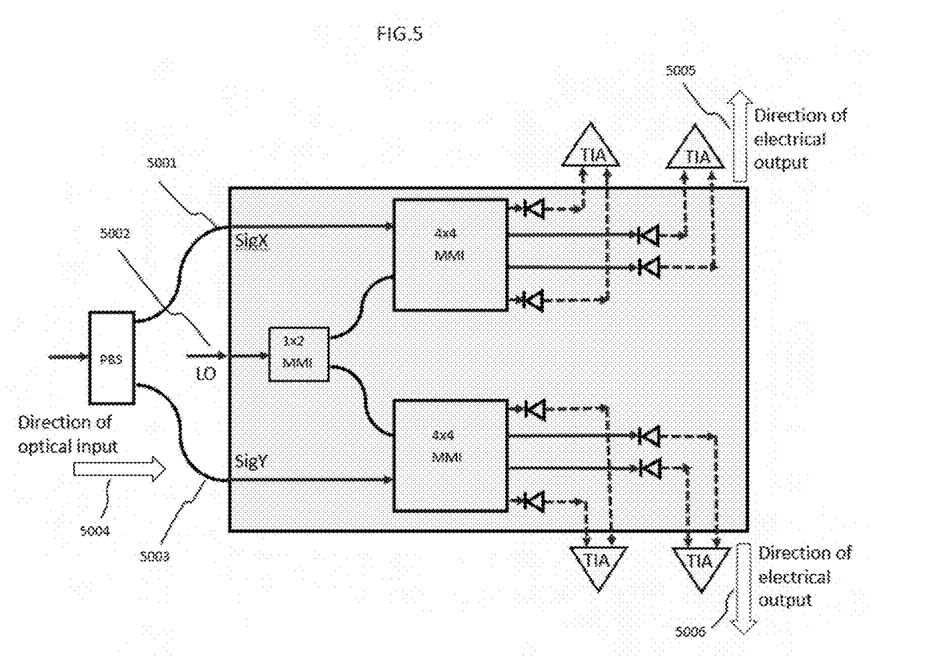
FIG. 5 shows a schematic view of a prior art DP-QPSK receiver, wherein the LO input is located between the SigX and SigY and the optical inputs and electrical outputs are perpendicular to each other.

3) One coherent receiver chip, which contains items (1)-(4), where (2) uses two 4×4 MMI couplers as optical hybrids, together with electrical crossings over the optical waveguides, as shown in FIG. 5 (V. Houtsma, N. G. Weimann, T. Hu, etc. 'Manufactural Monolithically Integrated InP Dual-Port Coherent Receiver for 100 G PDM-QPSK Applications', OML2, OFC'2011). This configuration is very compact because of the higher integration level and vertical electrical-optical crossings; and it also requires only a two port optical alignment. However, it still poses three issues: first is that the LO port is sandwiched between the two signal ports and so it complicates optical assembly; second, the electrical outputs are not co-linear with the optical inputs, creating further difficulty in module design; and third, the output waveguide path length is not balanced which results in large channel skew.

SUMMARY OF THE INVENTION

The present invention proposes a unique architecture for an integrated coherent receiver chip used for applications using DP-QPSK and higher coherent optical modulation formats. It overcomes the issues of the prior art and provides an integrated coherent chip suitable for a hybrid coherent receiver module which not only meets all performance requirements but also enables efficient and reliable assembly processes.

Figure 6:
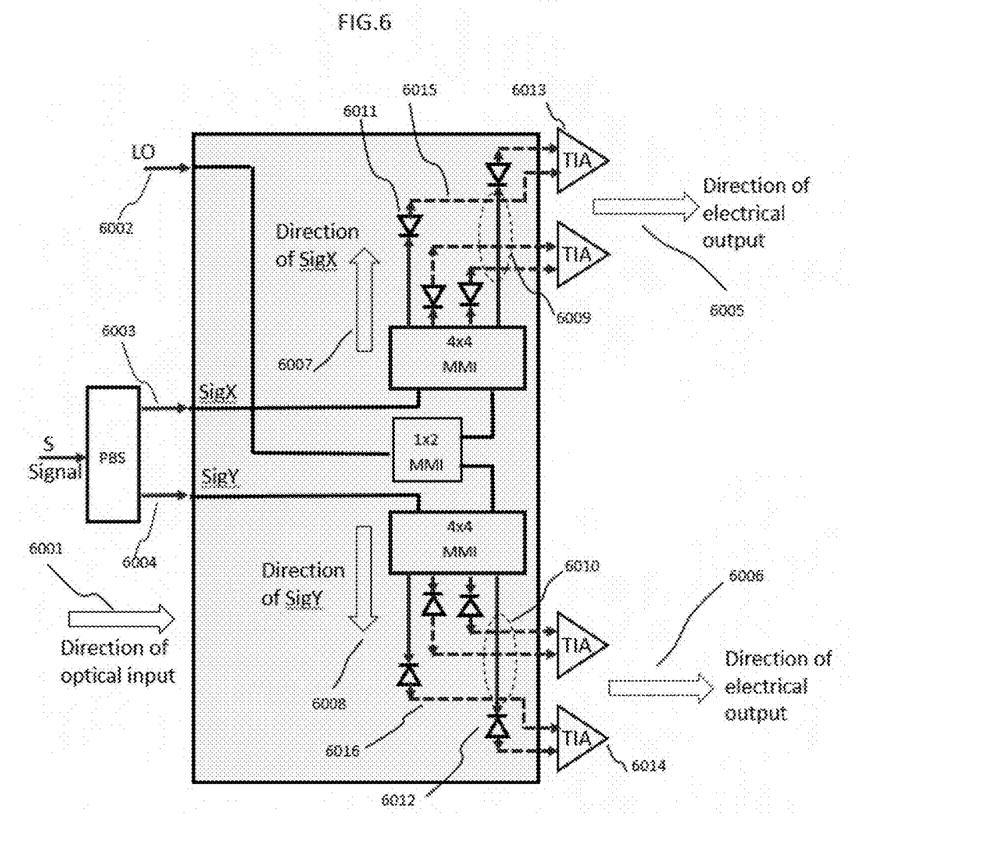
FIG. 6. presents a schematic view of the first embodiment of the invention.

The first embodiment of the proposed architecture is a coherent receiver chip, which integrates items (1)-(4), as depicted in FIG. 6. The core of this receiver chip is a photonics integrated chip (PIC) which has two optical hybrids, eight high speed waveguide photo-detectors (WPD) with on-chip bias circuitry. The geometric arrangement of the proposed architecture directs the optical axes of the 90° hybrids parallel to the input optical facet. The benefits of this arrangement are threefold. First, it widens the chip and provides the space to spread the three optical inputs so that the separation of SigX and SigY can readily be adjusted to match the requirements of the PBS. Moreover, the LO can be remote from the signal pair at the chip facet and yet routed between the SigX and SigY paths, where it is split and then fed into each of the two hybrids. This arrangement separates the LO and the signal attachment processes, and thereby greatly improves the efficiency and quality of the input optical coupling as well as enables reliable and high yield module fabrication.

The second benefit of the proposed architecture, wherein the optical axes of the 90° hybrids are oriented parallel to the input facet, is that the waveguide outputs of the hybrid can be directed to the corresponding electrical outputs without any optical waveguide crossings and yet maintaining a co-linear configuration of the optical inputs and the electrical outputs. Here the connections between the optical hybrids and the electrical outputs are made by optical waveguides and electrical transmission lines using vertically integrated electrical-optical crossings instead of optical waveguide crossings, resulting in reduced chip size and propagation loss. This arrangement also adds the flexibility to balance the optical delays with the electrical delays so that the net total delay difference, between the I and Q channels and between photodetector pairs, is minimized. Furthermore, the skew compensation between the two polarizations (SigX and SigY) is facilitated by re-ordering the waveguide inputs to the optical hybrids such that the connections between the optical hybrid and electrical outputs can be mirrored.

A third advantage of the proposed architecture is that the arrangement also allows wide separation of the electrical outputs, which results in better module thermal management and easy electrical connections. In addition, the proposed architecture enables a variable chip aspect ratio for different packaging needs, i.e. a wider chip width in exchange for a shorter length.

Figure 7:
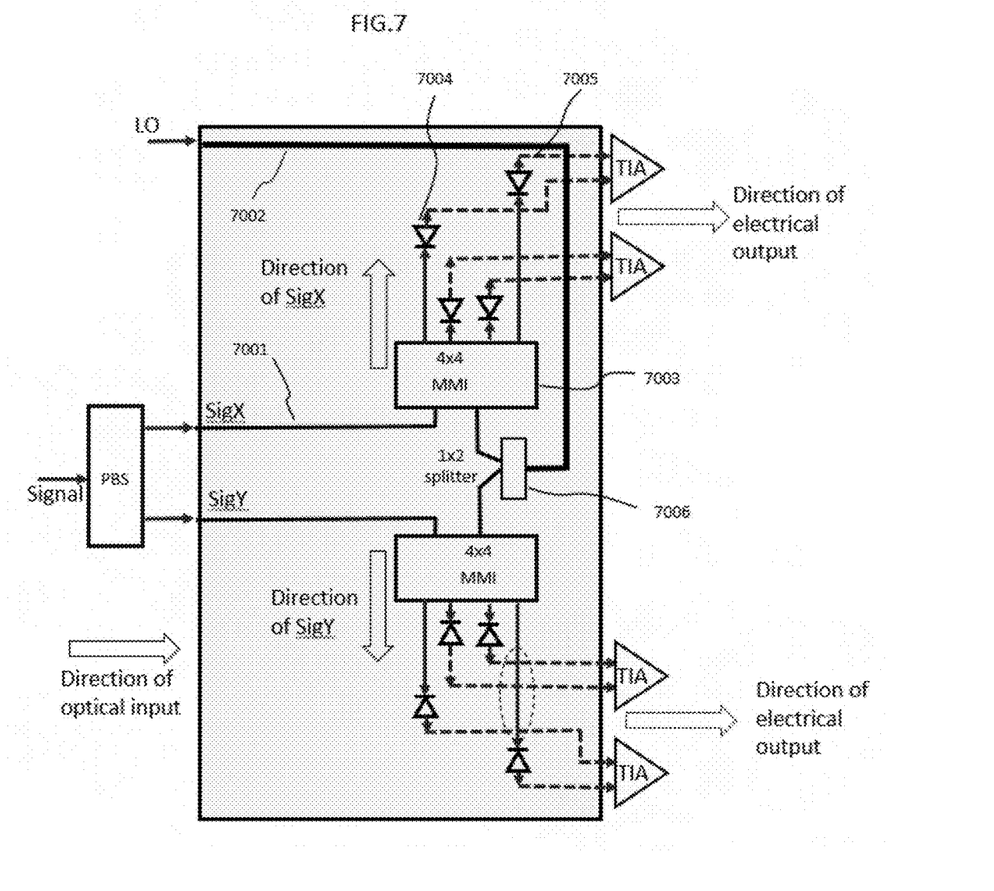
FIG. 7 illustrates another embodiment of the invention which eliminates optical waveguide crossings.

In another embodiment of the architectural arrangement of the chip, the optical crossing is completely eliminated by routing the LO optical waveguide around the output of the 90° hybrid and photodetectors, and under the electrical transmission lines, to the input of the optical hybrid, as shown in FIG. 7.

In the embodiment of FIG. 7, the optical axes of the 90° hybrids can also be oriented perpendicular to the input facet while keeping the waveguide photodetectors parallel, or at a small angle (up to 15°), to the input facet. Such an arrangement provides more flexibility in the locations of the four electrical outputs of X-polarization relative to that of Y-polarization, including a side by side configuration to accommodate a Quad-Trans-Impedance Amplifier.

Figure 8:
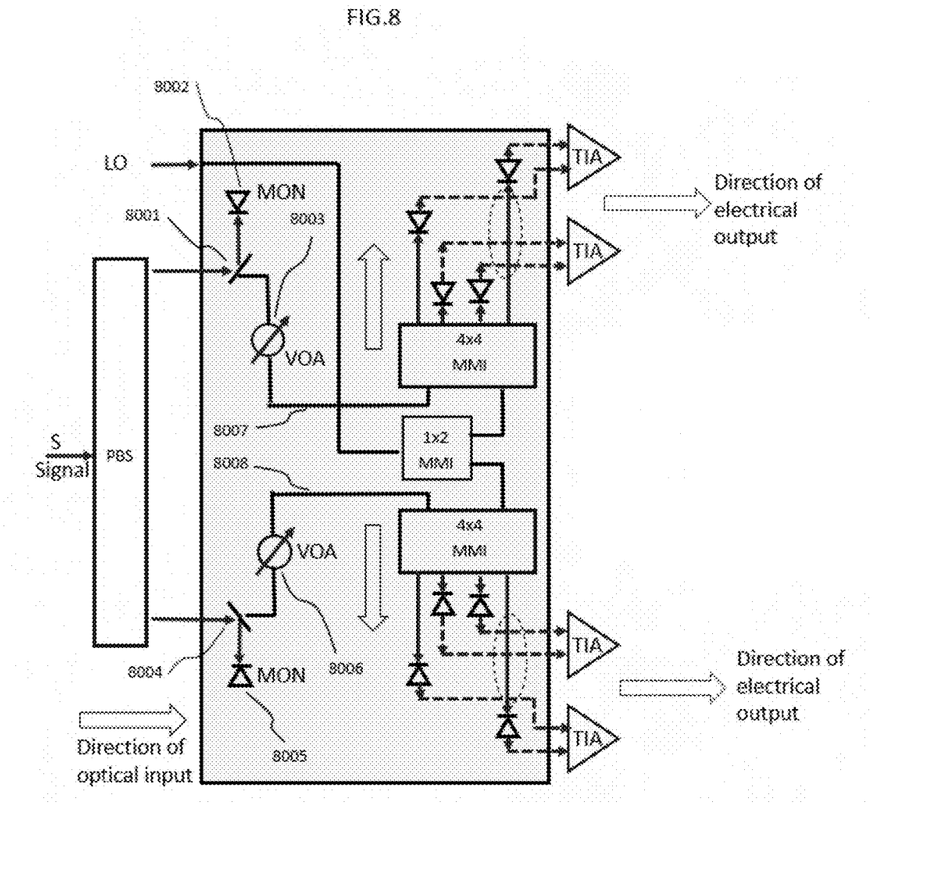
FIG. 8 shows another embodiment of the invention, wherein VOA and monitoring functions are included.

In the next embodiment of the chip architectural arrangement, the VOAs and MONs are integrated on chip, after the external micro-optics PBS, as illustrated in FIG. 8. In this configuration, a separate VOA and MON is used for each polarization so that the VOAs and MONs only operate for single polarization. The two VOAs are then connected together to use a single control source and the two MON outputs are combined for total signal power monitoring. Consequently, the polarization dependent loss (PDL) of the VOA, and the tracking error of the monitor, are only affected by differences between the VOAs resulting from process variations, which are small due to their close proximity on the chip. This approach provides a low PDL and low tracking error solution for the control of the signal level of the coherent receiver chip.

Figure 9:
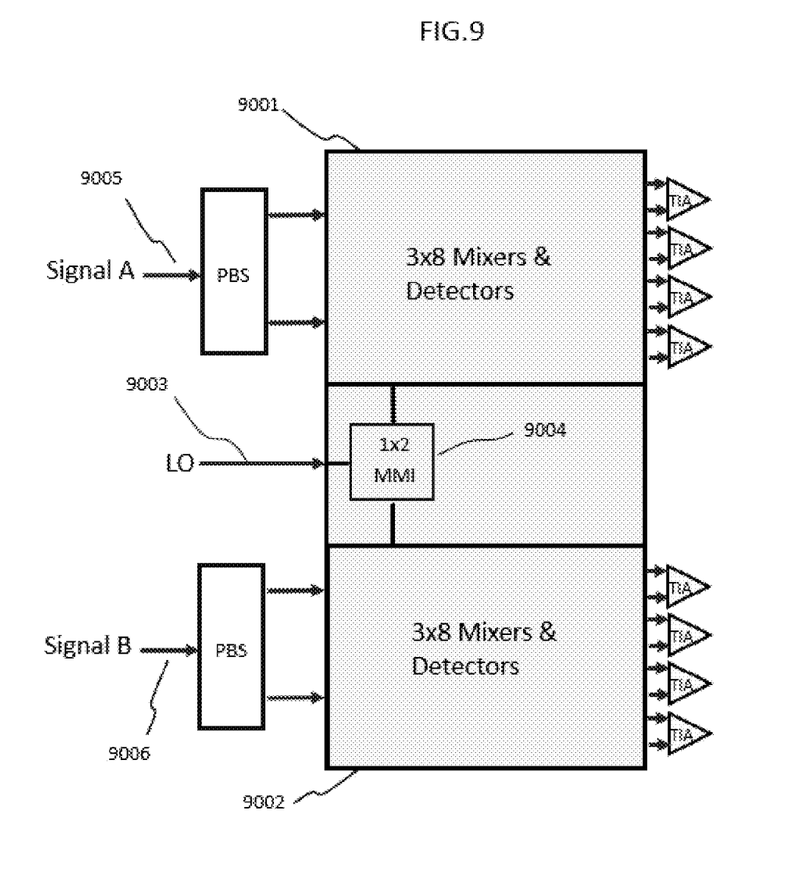
FIG. 9 presents another embodiment of the invention wherein two coherent receivers are integrated on the same chip with a common LO input.

In another embodiment of the chip architectural arrangement, the compactness and the functions of the chip can be further enhanced by having an array of two or more coherent receivers integrated on a single chip, wherein the LO can be shared between all receivers. FIG. 9 shows an exemplary configuration of such a device wherein two coherent receivers are integrated. This arrangement doubles the information capacity of the coherent receiver chip by allowing integration of two separate signal channels.

This architecture can also be applied to higher modulation format components, and can be fabricated from InP, Silicon, Silicon Nitride, Silicon Germanium and Silica on silicon material systems, or any combination of the aforementioned materials.

BRIEF DESCRIPTION OF THE DRAWINGS

The present invention, together with the objects, features and advantages thereof, may best be understood by reference to the following description of the drawings in which.

DETAILED DESCRIPTION OF EMBODIMENTS OF THE INVENTION

Preferred embodiments of the present invention will be described below with reference to FIGS. 1-9. It is instructive to start the description with a review of the previous art.

FIG. 1 presents a schematic view of a generic 90° hybrid with two inputs: the signal S 101 and the local oscillator field L 102 are launched into the mixer 110 where both fields interfere and appear at the output of the MMI as in-phase components S+L 121 and S−L 122, and quadrature components S+jL 123 and S−jL 124.

FIG. 2A illustrates the situation where the hybrid is implemented by means of waveguide mode interference coupler which comprises four 3 dB couplers 210 211 213 214 and a 90° phase shift 212. At the output of the hybrid the optical signals, marked as 221, 224, are directed into photodetectors 231, 224, where the light is detected and transformed into electrical signals 241, 244 which are directed into the TIAs 251, 254.

FIG. 2B presents the hybrid in the form of 4×4 MMI coupler 310 wherein only two input ports 301, 302 are used. At the output of the hybrid the optical signals S+jL 323 and S−jL 324 appear in the two middle waveguides whereas S+L 321 and S−L 322 appear in the two outermost waveguides. Consequently, there is a challenge of connecting the waveguide 322 to photodetector 332 because the two electrical signals 341 and 342 need to be connected to same TIA 351. This challenge is addressed in FIG. 2B by two waveguide crossings which results in a large footprint and introduces extra optical loss because waveguide 322 needs to cross waveguides 323 and 324.

FIG. 2C presents the hybrid in the form of 4×4 MMI coupler 410 wherein only two input ports 401, 402 are used. At the output of the hybrid the optical signals S+jL 423 and S−jL 424 appear in the two middle waveguides whereas S+L 421 and S−L 422 appear in the two outermost waveguides. Consequently, there is a challenge of connecting the electrical outputs of 431 and 432 to TIA 451. This challenge is addressed by crossing electrical transmission line 442 over optical waveguides 423 and 424.

FIG. 3 presents schematic view of a fully integrated coherent receiver chip, wherein the Signal 3001 is coupled into the chip and transmitted through a power monitor 3002, VOA 3003 and polarization beam splitter (PBS) 3004. The polarized signal is mixed with the LO signal 3005 in hybrids 3007 and 3008, after the beam splitter 3006, and detected by the photodetector array 3010 and then the electrical signal is directed to the output electrical array 3011.

FIG. 4 illustrates the realization of a coherent receiver in the prior art by A. Beiling, N. Ebel, A. Matiss, and G. Unterborsch, 'Fully-Integrated Polarization-Diversity Coherent Receiver Module for 100 G DP-QPSK", OML5, OFC'2011 wherein bulk optics components such as collimator (C, 4003), two half wave plates (HWP, 4004 and 4008), the PBS cube 4005, a skew compensator (SC, 4006) and two micro-lens arrays (L, 4007 and 4009) are used to prepare the optical signal 4001 and 4002 for coupling into 2 separate InP-based chips 4010 and 4020.

FIG. 5 shows another realization of a coherent receiver in the prior art wherein a single integrated coherent receiver chip is used to process signals of both polarizations [V. Houtsma, N. G. Weimann, T. Hu, et al, 'Manufactural Monolithically Integrated InP Dual-Port Coherent Receiver for 100 G PDM-QPSK Applications', OML2, OFC'2011]. Distinctive features of this approach (which create obstacles in the packaging) are (i) the LO input 5002 is located between the SigX 5001 and SigY 5003 optical inputs and (ii) the direction of the electrical output signals 5005 5006 are perpendicular to the direction of the optical signal input 5004.

FIG. 6 presents a schematic view of the main embodiment of the invention. Specific features of the layout are (i) the LO input 6002 is remote from the two adjacent signal inputs 6003 6004, which facilitates the fiber attachment process; (ii) the direction of the optical signal input 6001 is parallel to the electrical signal outputs 6005 6006; (iii) The optical axes of the 90° hybrids 6007 6008 are perpendicular to 6001; (iv) electrical crossings over optical waveguides 6009 6010 to connect the eight photodetectors 6011 6012 to TIA arrays 6013 6014; (v) electrical transmission lines 6015 6016 which are used for optical skew compensation.

FIG. 7 illustrates another embodiment of the invention which includes all the features in FIG. 6 but eliminates any optical crossing of the signal 7001 and LO 7002 waveguides by routing 7002 around the output of the 90° hybrid 7003 and photodetectors 7004, and under electrical transmission lines 7005 to connect to the input of the optical hybrid 7003 after the LO beam splitter 7006.

FIG. 8 illustrates another embodiment of the invention which includes all the features in FIG. 6, but is complemented with more functional components: the taps 8001 8004 with monitor photodetectors 8002 8005 followed by VOAs 8003 8006 are added to the signal paths 8007 8008. The benefit of such arrangement compared to the generic schematic of FIG. 3 is the two polarization channels can be better balanced and monitored.

FIG. 9 presents another embodiment of the present invention which integrates two duplicates of the arrangement in FIG. 6 9001 9002 but uses a shared single LO source 9003 which is split by a 1×2 splitter 9004. This arrangement doubles the information capacity of the coherent receiver by allowing demodulation of the two separate signal channels 9005 9006.

What is claimed is:

1. A monolithically integrated optical coherent receiver chip having opposing chip input and output facets, the chip comprising:
    first, second, and third optical inputs disposed at the chip input facet, wherein the first optical input corresponds to a local oscillator, the second optical input corresponds to an X-polarized signal, and the third optical input corresponds to a Y-polarized signal;
    first and second 90° optical hybrids positioned on the chip and respectively designated for the X-polarized and Y-polarized signal, wherein the first and second optical hybrids each has two input waveguides and four output waveguides;
    first and second pairs of four waveguide photodetectors respectively optically connected to the first and second optical hybrids by the corresponding four output waveguides, wherein optical axes of the waveguide photodetectors are oriented parallel to or within an angle up to 15 degrees to the chip input facet; and
    first and second pairs of four transmission lines connecting electrical signals from the respective first and second pairs of waveguide photodetectors to corresponding electrical outputs of the chip aligned along the chip output facet,
    wherein the corresponding four output waveguides of the first and second optical hybrids and the corresponding first and second pairs of four transmission lines form first and second pairs of four delay paths from outputs of the corresponding first and second optical hybrids to the corresponding electrical outputs of the chip,
    wherein a net total delay imbalance between the delay paths is minimized,
    wherein the first, second, and third optical inputs incorporate on-chip spot size converters with a mode size at the chip input facet matching that of a single mode fiber,
    wherein a distance between the second and third optical inputs matches that of an external polarization beam splitter, and
    wherein the first optical input is positioned away from the second and third optical inputs.

2. The chip according to the claim 1, wherein optical axes of the first and second optical hybrids are oriented substantially parallel to the chip input facet, with the first and second optical hybrids having a reflection symmetry wherein the input waveguides are closer than the output waveguides.

3. The chip according to claim 1, wherein optical axes of the first and second optical hybrids are substantially perpendicular to the chip input facet, with the output waveguides being bent to match the orientation of the corresponding waveguide photodetectors.

4. The chip according to claims 2 or 3, wherein the first and second optical hybrids and the corresponding input waveguides have a rotational symmetry about a rotational point, the two pairs of four delay paths have a reflection symmetry about a reflection axis perpendicular to the chip input facet, and the rotational point lies on the reflection axis.

5. The chip according to claim 4, wherein a first optical waveguide corresponding to the first optical input crosses one of second and third optical waveguides corresponding to the second and third optical inputs at a waveguide crossing aligned between said the first and second optical hybrids, and
    the first optical input is split into two local oscillator waveguide inputs after the waveguide crossing that are directed into the corresponding first and second optical hybrids.

6. The chip according to claim 4, wherein the first optical input is routed via a first optical waveguide around the output waveguides of one of the first and second optical hybrids and the corresponding waveguide photodetectors, and under the corresponding transmission lines to be aligned between the first and second optical hybrids, and the first optical input is then split and directed into the corresponding first and second optical hybrids.

7. The chip according to claim 5, wherein the first and second optical hybrids are oriented at an angle between 0° to 90° relative to the chip input facet to achieve a different chip aspect ratio.

8. The chip according to claim 7, further comprising a tap monitor followed by a variable optical attenuator inserted in each of the X-polarized and Y-polarized signals between the chip input facet and the input waveguides of the corresponding first and second optical hybrids, wherein the variable optical attenuators are operated separately or from a single control, and wherein the output of each of the tap monitors is combined or used separately.

9. The chip comprising an array of at least two coherent receivers according to claim 7, wherein at least one local oscillator is shared between the array.

10. The chip according to claim 1, wherein the waveguides comprise at least one of the following materials: GaAs, InP, GaAs-based ternary and quaternary materials, InP-based ternary and quaternary materials, silicon and silicon oxide materials, silicon nitride and polymer materials.

11. The chip according to claim 1, further comprising composite materials including layers of materials of a different nature which are brought in close proximity by wafer-bonding or nano-membrane stacking.

12. The chip comprising an array of at least two coherent receivers according to claim 8, wherein at least one local oscillator is shared between the array of the coherent receivers.

13. The chip according to claim 6, wherein the first and second optical hybrids are oriented at an angle of about 0° to 90° relative to the chip input facet to achieve a different chip aspect ratio.

14. The chip according to claim 13, further comprising a tap monitor followed by a variable optical attenuator inserted in each of the X-polarized and Y-polarized signals between the chip input facet and the input waveguides of the corresponding first and second optical hybrids, wherein the variable optical attenuators operate separately or from a single control, and wherein the output of each of the tap monitors is combined or used separately.

15. The chip comprising an array of at least two coherent receivers according to claim 13, wherein at least one local oscillator is shared between the array.

16. The chip comprising an array of at least two coherent receivers according to claim 14, wherein at least one local oscillator is shared between the array.

* * * * *